March 15, 1938.　　　T. B. CLARK　　　2,111,169
VALVE
Filed June 25, 1931　　　2 Sheets-Sheet 1
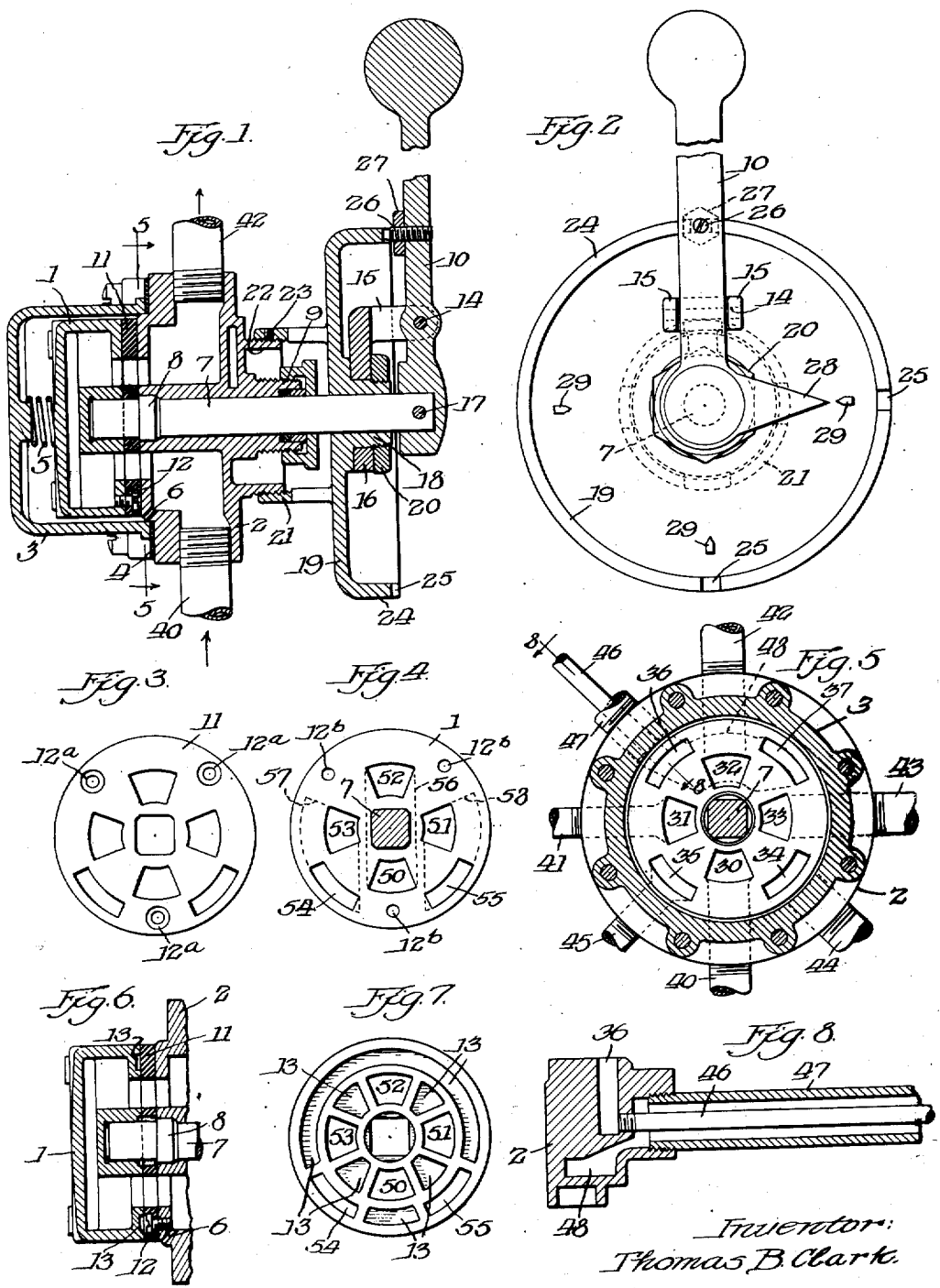
Inventor:
Thomas B. Clark.

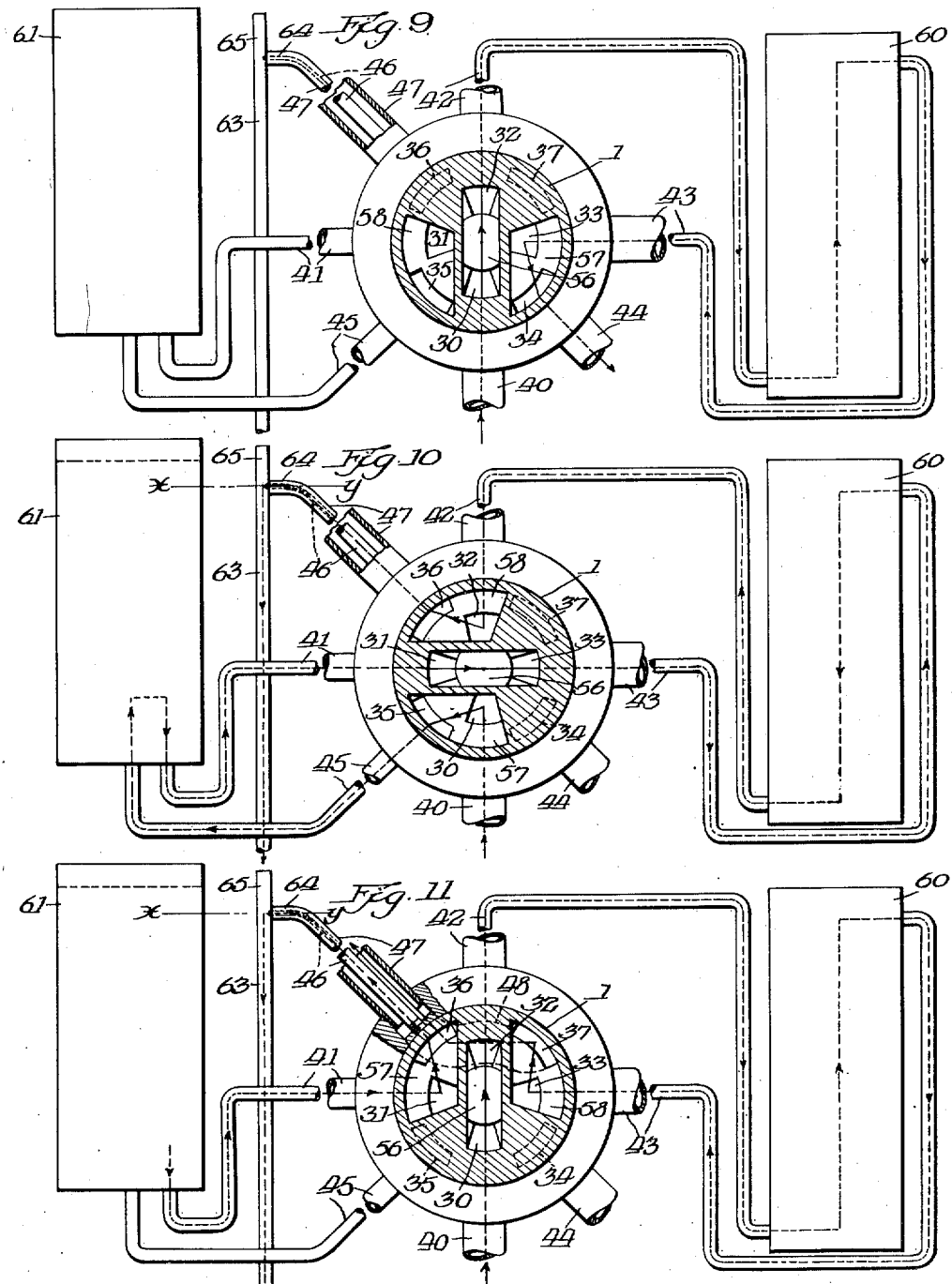

Patented Mar. 15, 1938

2,111,169

UNITED STATES PATENT OFFICE 2,111,169

VALVE

Thomas B. Clark, Rockford, Ill., assignor, by mesne assignments, to The Permutit Company (1934), Wilmington, Del., a corporation of Delaware Application June 25, 1931, Serial No. 546,694

16 Claims. (Cl. 251—87)

This invention relates to an improved multi-ported valve for controlling circulation of fluids, and to a water softening apparatus the functioning of which is controlled by such valve.

In a valve for circulating water and regenerating solution through a base-exchange water softener, it is important that no leakage should develop between the coacting valve members, while on the other hand the valve should be operable without undue turning effort. The present invention fulfills these requirements and provides a multi-ported valve of practical character for the service indicated, and one which will be durable and reliable in service. This is accomplished by the provision of a yieldable gasket between the stationary and the movable members of the valve and the further provision of means to lift the movable gasket from its seat on the yieldable member during shifting from one position to the other.

One practicable construction of valve and operating means therefor embodying the invention, in connection with one illustrative flow control system for a base-exchange water softener, are shown in the accompanying drawings, by reference to which the invention will be clearly understood.

In said drawings:

Fig. 1 is a sectional view of the valve, the section being taken longitudinally of the valve axis;

Fig. 2 is a front view thereof;

Fig. 3 is a face view of a ported gasket attached to the face of the rotary member of the valve and which in this instance may be considered a part of said rotary valve member; that is, as being integrally united therewith;

Fig. 4 is a corresponding face view of said rotary valve member, indicating by dotted lines certain passages in said member connecting certain ports in the face of said member;

Fig. 5 is a cross section taken on the line 5—5 of Fig. 1, looking in the direction of the arrows, and showing the ported face of the stationary valve member with which the ported rotary member coacts;

Fig. 6 is a detail sectional view showing the gasket attached to the stationary valve member and showing the rotary valve member in a slightly modified form;

Fig. 7 shows the face of said rotary member as so modified;

Fig. 8 is an enlarged sectional detail view showing the drain pipe connections with the stationary valve member, the section being on the line 8—8 of Fig. 5;

Figs. 9, 10, and 11 are diagrammatic views of the illustrated water softening apparatus showing in Fig. 9 the flow connections established by the valve in the normal or softening position, in Fig. 10 the connections established when the valve is set in the regenerating or salt wash position, and in Fig. 11 the connections established when the valve is in the rinse or flushing position; the rotary part of the valve appearing in section in each of these views, and the course of the flow in the different positions of the valve being indicated by the heavy dotted lines.

As represented in the drawings, the rotary disc type valve member 1, which may be designated a stem plate seated on or against the flat ported face of the valve body or stationary member 2, is enchambered by the cap 3 which is bolted to the valve body with an interposed gasket 4 to provide a fluid tight joint. In this instance the rotary valve member is held seated by the spring 5 and by hydraulic pressure which is admitted to the chamber enclosing the valve through the port 6. By turning the rotary valve member to different positions, different flow connections are established through the water-softening apparatus as required for the functioning of the apparatus. In this instance the rotary valve member has three operative positions, in one of which water to be softened flows through the valve to the softener while soft water is discharged from the softener through the valve to a service connection. In another position, regenerating solution passes through the valve to the softener and from the softener through the valve to a drain connection, after which water for rinsing or flushing is circulated through the softener. Depending upon the particular cycle of regenerating operations which is used, the flow for the flushing operation may take place through the valve while in the regenerating position, or as in this instance the flow for flushing may take place while the valve is in another position. In view of the particular cycle of operations of the illustrated apparatus, the specific valve selected for illustration, as to its general character and specific number and arrangement of its valve ports, is similar to that disclosed in the pending application of Robert H. Colvin, Serial No. 337,754 filed February 6, 1929 (Patent No. 1,910,753). It will be understood that this construction is exemplary. The stationary member of this valve is ported as shown in Fig. 5, its several ports being in communication through separate passages in the valve body with the respective pipes of the circulation system. The rotary member is ported as shown in Fig. 4, its ports being connected in pairs by passages in the rotary member. In different positions of the rotary member, its ports register with different ports of the stationary member in such manner as to establish the different flow connections indicated in Figs. 9, 10, and 11 and hereinafter more fully explained.

For turning the rotary valve member, a valve operating rod or stem or shaft 7 extends centrally through the valve body and has an approximately square inner end seated in a socket therefor in the rotary member. By counter-boring the inner end of the bearing for the valve rod, a seat is provided for the annular thrust shoulder 8 of the valve rod. An extension of the valve rod bearing is provided with a stuffing box at 9 to prevent leakage along the valve rod. The seating of the thrust shoulder 8 also contributes to prevent such leakage. Operating means for the valve rod is represented by the lever or handle 10.

It is important that there should be no leakage between the cooperating ported faces of the valve members, since aside from possible interference with the flow such leakage would afford opportunity for intermingling of different fluids by cross-circuiting between different ports of the valve. In order, therefore, that the valve members may coact with a leak-proof joint, a ported gasket 11 of soft rubber or other appropriate elastic or yieldable material is arranged to be pressed between the cooperating valve members in every operative position of the rotary member. This intermediate soft rubber element under pressure gives an absolute seal while means are provided for relieving the pressure when the relative position of the two members is to be changed; the element being attached to and moving with one of the members. The gasket may be attached to the ported face of either of the two coacting valve members and provided with ports to correspond with the ports of the member to which it is attached. Advantageously, as shown in Figs. 1 to 4, the gasket is attached to and ported to correspond with the ports of the rotary member, and may be considered a part thereof, or as providing a gasket facing for such member. The gasket can be attached by cementing or by fastening, as, for example, with a plurality of attaching screws 12 having their heads embedded in recesses in the gasket. Only one of such screws appears in Fig. 1. In Fig. 3, the recesses in the gasket to receive the screw heads are indicated at 12ª and in Fig. 4 the screw holes in the face of the rotary valve member are indicated at 12ᵇ.

As above stated, the rubber gasket may be affixed to either valve member. It is shown attached to the rotary member in Fig. 1, while in Fig. 6 the gasket 11 is shown attached to the stationary valve member 2. In the operation of the valve, as will be presently explained, the rotary member is lifted or unseated preliminarily to and during each turning movement, so as to separate the gasket from the member to which it is not attached, thereby avoiding undue wear and tear on the gasket and excessive frictional resistance to the turning effort.

Thus the rubber gasket, being affixed to one of the cooperating valve members, is in contact with the other member only while the rotary member remains seated in an operative position. If it is desired to increase the specific pressure of the contact surfaces of the two coacting members by reducing to a minimum the surface contact between the face of the rubber gasket and the other member (i. e. the member to which the gasket is not attached), either the face of the gasket or the face of said other member may be appropriately recessed. For example, in Fig. 6, where the gasket is affixed to the stationary valve member 2, the face of the other or rotary valve member is formed with the several recesses indicated at 13. The gasket tends to sink slightly into the recesses and to be retained thereby.

The valve operating means provided in the illustrative structure, which in this instance is a hand operated valve, although that is exemplary, is such as to necessitate unseating of the rotary valve member before it can be rotated and to maintain it unseated during the turning movement and to cause the automatic re-seating of the rotary member when it is brought to its next operative position. For this purpose, the valve lever 10 is fulcrumed at 14 between yoke arms 15 projecting from swiveled collar 16, and said lever is pivotally connected at 17 to the valve rod, which is inwardly shiftable along its axis a sufficient distance to unseat the rotary valve member. Said swiveled collar 16 and arms 15 with fulcrum 14 form an abutment mounted on a bearing stud 18 projecting from the plate or frame member 19, collar 16 being retained in place by the nut 20. The bearing for the swiveled collar is concentric with the valve rod, which extends through the plate 19. Said plate 19 is suitably fixed to the valve body 2, the plate in this instance being integrally cast with an internally threaded sleeve 21 screwed upon a threaded tubular extension 22 from the valve body, whereby the plate 19 is suitably supported in proper relation to the valve body and stator member 2. Its adjustment may be secured by the set screw 23. The plate 19 is shown as a dished plate which has the annular rim 24 provided with the notches 25 for engagement by a detent or catch 26 carried by the valve lever, said detent being shown as a screw secured in fixed position by the lock nut 27. The notches 25 are arranged to hold the lever in the respective positions for the respective operative positions of the rotary valve member. The valve lever may have a pointer 28 to register with indexes 29 in these positions.

Normally the partly unbalanced hydraulic pressure on the rotary valve member, together with the force exerted by the spring 5, holds the rotary valve member seated, whereby the catch 26 is engaged with a notch 25 and thus prevents any accidental dislodgment of the lever. In Figs. 1 and 2 the valve is shown in the normal or softening position. In this instance the rotary valve member is rotated clockwise a quarter turn or 90° to a second position, and another quarter turn to a third position, and then through a half turn or 180° to its normal position. To turn the rotary valve member from one operative position to another, the lever 10 is forced outwardly or in a direction to withdraw the detent 26 from its retaining notch, thereby forcing the valve rod inwardly and unseating the rotary valve member against the resistance of the spring 5 and the hydraulic pressure on said valve member. The lever is then swung to turn the valve. In this movement it may be maintained, by the pressure of the spring 5, in engagement with the annular rim 24, and with its detent 26 sliding over such rim, and when the catch 26 is brought opposite the next notch, the spring action on the rotary valve member will cause the catch to snap into the said notch, thereby locking the valve in this operative position. If in the turning movement the operator should hold the lever out and clear of engagement with the rim 24, then upon bringing the pointer 28 into registration with the next index 29 and releasing the lever, it would automatically snap in place thereby causing the seating of the rotary valve member.

The spring 5 is shown as a coiled spring centered by an internal projection of the cap 3 and bearing centrally on the rotary valve member. This spring is placed under compression by the attachment of the cap to the valve body. Preferably the spring is under just sufficient compression to overcome the friction in stuffing box 9 and to seat the rotary valve member when the lever is in position to allow such seating. After the rotary valve member is seated, it is held seated under the greater hydraulic pressure of the liquid in the cap or valve chamber which is in communication through the port 6 with the inlet passage of the valve body, said valve body being in communication through the pipe 40 with a source of water under pressure.

If the spring were more powerful, its action could be depended upon without providing for application of hydraulic pressure to hold the rotary valve member firmly seated in its operative position. If the spring were omitted the valve would be operative and firmly seated by hydraulic pressure while in its operative position. It is, however, desirable to employ a spring for pressing the detent 26 of the valve lever against the annular rim or in a direction to seat the valve.

Explanation will now be made of the specific valve illustrated, in connection with the apparatus shown. The rotary member 1 typifies a ported valve rotor cooperating with and controlling the flow through a ported stationary valve body. For convenience these members will hereinafter be referred to as the rotor and stator.

The stator ports 30 to 37 communicate respectively, through passages in the valve body, with the respective pipes 40 to 47; the port 37 being in communication with the drain pipe 47 by the arcuate cored passage 48 (Figs. 5 and 8) and the port 36 being in communication with the drain pipe through the small pipe 46 projecting into said drain pipe.

In the normal or softening position of the valve, the rotor ports 50, 51, 52, 53 register with the stator ports 30, 31, 32, 33, while the rotor ports 54 and 55 register with the stator ports 34 and 35. The flow is from the hard water supply pipe 40 through the valve via stator port 30, rotor port 50, passage 56, rotor port 52, and stator port 32, to the pipe 42 leading in this instance to the lower end of the softening tank 60, as shown in Fig. 9. The hard water supplied by said pipe 42 to the softening tank flows upward through the bed of base-exchange material in the tank, while the softened water is discharged from the tank through the pipe 43 and flows through the valve via stator port 33, rotor port 53, passage 57, rotor port 54, and stator port 34 to the pipe 44 for delivering the softened water to service.

A quarter turn of the valve rotor in a clockwise direction brings it to the regenerating or so-called salt wash position shown in Fig. 10, in which the rotor ports register with a different group of ports of the stator, and the flow is as follows: from the supply pipe 40 water flows through the valve via stator port 30, rotor port 53, passage 57, rotor port 54, and stator port 35 to pipe 45 leading to the bottom brine compartment of a Sweeney brine tank 61, i. e., a tank of the type disclosed in United States patent to Sweeney No. 1,693,829 of December 4, 1928. Said brine compartment being closed during regeneration, the water supplied thereto displaces a proportionate quantity of brine which is conducted by the pipe 41 to and through the valve via stator port 31, rotor port 50, passage 56, rotor port 52, and stator port 33 to the pipe 43. Said pipe 43 conducts the brine or regenerating solution to the upper part of the softener, and after flowing down through the softening material the spent solution is discharged by the pipe 42 through the valve via stator port 32, rotor port 51, passage 58, rotor port 55, and stator port 36, to the small drain pipe 46 enclosed by the drain pipe 47 (see Figs. 5, 8, and 10).

Another quarter turn of the rotor in a clockwise direction brings it to the flushing or so-called rinse position, in which the water flows from the supply pipe 40 through the valve via stator port 30, rotor port 52, passage 56, rotor port 50, and stator port 32, and by pipe 42 to and upwardly through the softener and thence from the softener by pipe 43 through the valve via stator port 33, rotor port 51, passage 58, and rotor port 55, and stator port 37 and passage 48 to the drain pipe 47, the course of the flow for flushing being shown in Fig. 11.

As explained in the Sweeney patent, the bottom brine compartment of the brine tank, with which the pipes 41 and 45 are connected, is normally in communication with a superposed compartment in which salt is dissolved, so as to supply concentrated brine to the compartment during normal operation. During the regeneration or brine flow to the softener, the connection between the two compartments of the brine tank is closed. Such connection is restored during the flushing operation, i. e., when there is no water flowing by the pipes 45 and 41 through the brine compartment. Now it is desired that the water in the brine tank should be maintained not above a certain level, and the illustrative valve embodies the provision whereby during the flushing there may also be a back flow from the brine tank by pipe 41 through the valve to the drain, only, however, if the water in the brine tank is above the desired level, and only until it is lowered to the desired level. This flow, while the valve rotor is in the flushing position, is from pipe 41 through the valve via stator port 31, rotor port 53, passage 57, rotor port 54, stator port 36, and small pipe 46 enclosed by the drain pipe. The flow referred to takes place only if the water level in the brine tank is above the discharge end of the small pipe 46 and ceases when the level drops to that of said discharge end, i. e. to the level indicated by the line $x-y$ in Figs. 10 and 11. In the particular construction shown, the said small pipe 46 extends to the point 64 where the drain pipe 47 joins the waste pipe 63 which has a vent 65 extending from the connection at 64 to a point above the water level in the brine tank, so that in the flushing operation there can be no siphoning action to bring the level of the water in the brine tank below the level $x-y$.

It will be understood that the invention is not limited to the particular embodiment thereof herein illustrated and described.

I claim:

1. A valve comprising two cooperative members, a discoid rotor having a flat face with ports therein, and a stator having a flat face with ports therein, the rotor being adapted to rotate about its axis and also to move along its axis, the ports in the rotor being adapted to register with the ports in the stator face, openings adapted to receive conduits for different liquids and in communication with the stator ports, the stator and the rotor being adapted in suitable angular positions of the rotor to establish communication through the valve openings for controlling a plurality of different liquid flows, a detachable member on the stator forming a chamber enclosing the rotor, a discoid ported gasket of soft resilient material of the nature of soft rubber interposed between rotor and stator, means for putting the rotor under a yielding pressure tending to force the rotor, stator and gasket together to form a tight seal in all the valve positions but normally preventing the rotor from being rotated without injury to the gasket, actuating means adapted both for moving the rotor axially a short distance away from the stator and also for rotating the rotor while moved away from the stator, said actuating means being adapted in operation to counteract said pressure thus relieving pressure from the gasket to permit free rotation and to prevent injury to the gasket, but permitting pressure to be exerted upon the gasket in each of the valve positions to maintain the seal.

2. The structure of claim 1, wherein the means for putting the rotor under yielding pressure comprises means for admitting fluid under pressure into the valve casing between the casing and the rotor so as to yieldingly force the rotor against the stator.

3. The structure of claim 1, the disc face of the rotor being provided with shallow chambers adapted to retain the gasket.

4. The structure of claim 1, the valve being provided with a member provided with an annular rim having notches corresponding to the positions of rotation of the rotor, the valve actuating means having a handle adapted to engage said notches and the rim being adapted to engage said handle.

5. The structure of claim 1 wherein the means for putting the rotor under yielding pressure comprises a spring pressing the rotor against the stator.

6. In a plate type multiple port valve, comprising two members having multiple ports, a resilient gasket between them and secured to the stationary member, the movable member having rings around its ports adapted to press into the resilient gasket to seal off one port from another, and means compelling the movable member to be lifted off its seat before it can be moved to another position.

7. In a plate type valve, the combination of a ported body member, a fluid tight cover on the body member, a ported stem plate inside the cover and shiftable to different positions on the body member, one of the ports in the body member being a pressure port and certain other ports therein being arranged to communicate therewith in certain positions of the stem plate, the pressure port having communication with the inside of the cover, a gasket of resilient material disposed on the body member having ports in register with the ports in the body member, said stem plate having projecting seat portions surrounding the ports thereof and adapted to be impressed in the yielding material of the gasket for fluid tight seals and also hold the stem plate in spaced relation to the gasket while seated, and means for unseating and moving the stem plate to different positions relative to the body member.

8. In a valve of the class described, the combination of a body member constituting the stator, a rotary plate arranged to be turned with respect to the body member and constituting the rotor, a flat ported gasket of resilient material on one of said members arranged to engage a flat ported face on the other of said members to provide different communications between the body member and plate in different positions of the plate, spring means for yieldingly urging the plate into contact with the body member to provide substantially leak-proof communication, an operating stem projecting from said plate for the turning thereof, a lever connected with the stem for turning the same, and means for raising the plate off the body member against the action of said spring means when the same is to be turned, said means including an abutment in a plane parallel to said flat ported face and arranged to have the lever fulcrum thereon in opposite directions in a vertical plane, whereby to permit positive raising and lowering of the stem by the same lever used in turning the same.

9. In a valve of the class described, the combination of a body member having a plurality of ports provided in a flat face therein, a rotary plate superimposed on the body member having ports provided therein for register with ports in the body member in different positions thereof, a cover on the body member enclosing said plate, a stem for turning the plate projecting therefrom, a lever pivotally mounted on the projecting end of said stem on a transverse axis, whereby to permit turning of the stem and plate by lateral movement of the lever, an abutment for said lever in a plane parallel to said flat face and adjacent the projecting end of said stem with relation to which the lever is arranged to fulcrum for rocking movement in either direction in a vertical plane, whereby to permit forcing the stem in one direction thereby raising the plate off the body member by movement of the lever in one direction and to permit forcing the stem in the opposite direction thereby replacing the plate on the body member by movement of the lever in the opposite direction.

10. A valve as set forth in claim 9 including a central flat ported gasket interposed between the body member and the plate member and fastened to one of said members with its ports in register with the ports of said member.

11. In a valve of the type described, comprising two multiple port members, one of which is rotatable relative to the other, and a resilient gasket between them and secured to the face of one of said members, the other of said members having rings around the ports thereof arranged to press into the gasket to seal communication between registering ports in said members, means compelling the member that is rotatable to be first lifted out of contact with the other member before it can be rotated, whereby to prevent any relative lateral movement between the surfaces of the members when in contact.

12. In a valve comprising multiple port members, a resilient gasket secured to the face of one of said members, the one member being stationary and the other being rotatable to bring different ports together, a stem operatively connected with said rotatable member, a lever for lifting, turning and positively lowering the stem, lifting of the stem causing lifting of the rotatable member whereby to prevent any relative lateral movement of the contacting surface of said rotatable member on the coacting surface of the other member, and an index plate having surfaces for the lever to bear against when it is lifting the stem, to slide on when it is turning said stem and to bear against when it is lowering said stem.

13. In a plate type multiple port valve comprising two members having multiple ports, a resilient gasket between them and secured to the stationary member, the movable member having rings around its ports adapted to press into the resilient gasket to seal off one port from another, a lever for lifting the movable member off its seat and turning it to the next position, and an index plate having slots for locating the lever and a surface for the lever to slide on when moved from one slot to another.

14. In a plate type multiple port valve comprising a body member having multiple ports, and a rotary stem plate member having ports arranged to register with the ports in the body, a resilient gasket on one of the two members just mentioned, means for lifting the plate and turning the same and thereafter seating the same in a different position to change the registration of the ports in the plate with the ports in the body, the said gasket being fixed on the one member, and the other member having projecting seats for impression in the yielding material of the gasket when the plate is seated, and means for predetermining a series of different positions of the plate with respect to the body, the aforesaid seats being so formed and related as to produce a substantially identical pattern on the gasket in every position of the plate whereby to insure the same sealing engagement of the plate with the body in all positions.

15. In a plate type valve, the combination of a ported body member, a ported stem plate member adapted to be unseated and seated in different positions of the body member to effect different communication between the ports of the body member in different positions of the plate member, a cover on the body member enclosing the plate member, one of the ports in the body member being a pressure port and having communication with the inside of the cover, one of the first two mentioned members having gasket means thereon and the other having projecting seat portions for engagement with the gasket means when the plate member is seated, whereby to provide fluid tight seals and hold the plate member in spaced relation to the body member although seated, and means for operating the plate member.

16. In a plate type valve, having two multiple port members, one member being adapted to be moved relative to the other to different operative positions, and one member having projecting seats around its ports for engagement with the other member to close communication between registering ports, said seats serving to hold the members in spaced relation when engaged, for the purpose described, said seats being of small width so as to lessen the area of contacted surfaces when the members are engaged, for the purpose described, resilient gasket means on the contacting face of one of said members and adapted to have the projecting seats engage and impress themselves therein and means for unseating, moving and reseating the movable member.

THOMAS B. CLARK.

DISCLAIMER 2,111,169.—*Thomas B. Clark*, Rockford, Ill. VALVE. Patent dated March 15, 1938. Disclaimer filed September 28, 1943, by the assignee, *The Permutit Company*.

Hereby enters this disclaimer to claims 6, 7, 11, 13, 14, 15 and 16 of said patent.

[*Official Gazette October 26, 1943.*]

DISCLAIMER 2,111,169.—*Thomas B. Clark*, Rockford, Ill. VALVE. Patent dated Mar. 15, 1938. Disclaimer filed June 28, 1946, by the assignee, *The Permutit Company*.

Hereby enters this disclaimer to claims 9 and 10 of said Letters Patent.

[*Official Gazette July 30, 1946.*]

other member, and an index plate having surfaces for the lever to bear against when it is lifting the stem, to slide on when it is turning said stem and to bear against when it is lowering said stem.

13. In a plate type multiple port valve comprising two members having multiple ports, a resilient gasket between them and secured to the stationary member, the movable member having rings around its ports adapted to press into the resilient gasket to seal off one port from another, a lever for lifting the movable member off its seat and turning it to the next position, and an index plate having slots for locating the lever and a surface for the lever to slide on when moved from one slot to another.

14. In a plate type multiple port valve comprising a body member having multiple ports, and a rotary stem plate member having ports arranged to register with the ports in the body, a resilient gasket on one of the two members just mentioned, means for lifting the plate and turning the same and thereafter seating the same in a different position to change the registration of the ports in the plate with the ports in the body, the said gasket being fixed on the one member, and the other member having projecting seats for impression in the yielding material of the gasket when the plate is seated, and means for predetermining a series of different positions of the plate with respect to the body, the aforesaid seats being so formed and related as to produce a substantially identical pattern on the gasket in every position of the plate whereby to insure the same sealing engagement of the plate with the body in all positions.

15. In a plate type valve, the combination of a ported body member, a ported stem plate member adapted to be unseated and seated in different positions of the body member to effect different communication between the ports of the body member in different positions of the plate member, a cover on the body member enclosing the plate member, one of the ports in the body member being a pressure port and having communication with the inside of the cover, one of the first two mentioned members having gasket means thereon and the other having projecting seat portions for engagement with the gasket means when the plate member is seated, whereby to provide fluid tight seals and hold the plate member in spaced relation to the body member although seated, and means for operating the plate member.

16. In a plate type valve, having two multiple port members, one member being adapted to be moved relative to the other to different operative positions, and one member having projecting seats around its ports for engagement with the other member to close communication between registering ports, said seats serving to hold the members in spaced relation when engaged, for the purpose described, said seats being of small width so as to lessen the area of contacted surfaces when the members are engaged, for the purpose described, resilient gasket means on the contacting face of one of said members and adapted to have the projecting seats engage and impress themselves therein and means for unseating, moving and reseating the movable member.

THOMAS B. CLARK.

DISCLAIMER 2,111,169.—*Thomas B. Clark*, Rockford, Ill. VALVE. Patent dated March 15, 1938. Disclaimer filed September 28, 1943, by the assignee, *The Permutit Company*.

Hereby enters this disclaimer to claims 6, 7, 11, 13, 14, 15 and 16 of said patent.

[*Official Gazette October 26, 1943.*]

DISCLAIMER 2,111,169.—*Thomas B. Clark*, Rockford, Ill. VALVE. Patent dated Mar. 15, 1938. Disclaimer filed June 28, 1946, by the assignee, *The Permutit Company*.

Hereby enters this disclaimer to claims 9 and 10 of said Letters Patent.

[*Official Gazette July 30, 1946.*]

DISCLAIMER 2,111,169.—*Thomas B. Clark*, Rockford, Ill. VALVE. Patent dated March 15, 1938. Disclaimer filed September 28, 1943, by the assignee, *The Permutit Company*.

Hereby enters this disclaimer to claims 6, 7, 11, 13, 14, 15 and 16 of said patent.

[*Official Gazette October 26, 1943.*]

DISCLAIMER 2,111,169.—*Thomas B. Clark*, Rockford, Ill. VALVE. Patent dated Mar. 15, 1938.
Disclaimer filed June 28, 1946, by the assignee, *The Permutit Company*.
Hereby enters this disclaimer to claims 9 and 10 of said Letters Patent.
[*Official Gazette July 30, 1946.*]